United States Patent
Mokry et al.

(10) Patent No.: US 6,552,979 B1
(45) Date of Patent: Apr. 22, 2003

(54) OPTICAL SERVO CONTROL CIRCUITS AND METHODS USING PULSE WIDTH MODULATION AND OFFSET CONTROL FOR DRIVING AN ELECTROMECHANICAL MOTOR

(75) Inventors: Wesley Ladd Mokry, Austin, TX (US); Rex Thomas Baird, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/702,174

(22) Filed: Oct. 30, 2000

(51) Int. Cl.[7] .............................................. G11B 15/52
(52) U.S. Cl. ................... 369/47.38; 369/47.48; 369/47.49; 369/44.11; 369/53.3
(58) Field of Search ......................... 369/44.11, 47.38, 369/47.39, 47.48, 47.19, 53.3

(56) References Cited

U.S. PATENT DOCUMENTS

| | | | |
|---|---|---|---|
| 5,128,812 A | * | 7/1992 | Uno ........................ 360/78.06 |
| 5,379,439 A | * | 1/1995 | Harrison et al. ............. 395/800 |
| 5,581,715 A | * | 12/1996 | Verinsky et al. ............. 395/309 |
| 5,754,024 A | * | 5/1998 | Sugiyama .................... 318/701 |
| 6,052,076 A | * | 4/2000 | Patton, III et al. ........... 341/144 |
| 6,084,378 A | * | 7/2000 | Carobolante ................. 318/811 |
| 6,128,261 A | * | 10/2000 | Suzuki ..................... 369/47.48 |

* cited by examiner

Primary Examiner—Aristotelis M. Psitos
(74) Attorney, Agent, or Firm—James J. Murphy; Winstead Sechrest & Minick, P.C.

(57) ABSTRACT

Servo control circuitry 300 includes a digital to analog converter 402 for converting digital servo control data into a pulse width modulated signal. A first conductor transmits the pulse width modulated signal to an external device 409. A second conductor transmits a reference signal derived from the clock signal to external device 409, external device 409 differentially receiving the pulse width modulated signal with respect to the reference signal.

7 Claims, 3 Drawing Sheets

OPTICAL SERVO CONTROL CIRCUITS AND METHODS USING PULSE WIDTH MODULATION AND OFFSET CONTROL FOR DRIVING AN ELECTROMECHANICAL MOTOR

CROSS-REFERENCE TO RELATED APPLICATIONS

The following co-pending and co-assigned application contain related information: Ser. No. 08/956,569, entitled "SYSTEMS AND METHOD FOR CONTROL OF LOW FREQUENCY INPUT LEVELS TO AN AMPLIFIER AND COMPENSATION OF INPUT OFFSETS OF THE AMPLIFIER" filed Oct. 23, 1997;

Ser. No. 09/282,121, entitled "CIRCUITS AND METHODS FOR EXCHANGING SIGNALS IN OPTICAL DISK SYSTEMS AND SYSTEMS USING THE SAME", filed Mar. 31, 1999; and Ser. No. 09/282,840), entitled "CIRCUITS AND METHODS FOR GAIN RANGING IN AN ANALOG MODULATOR AND SYSTEMS USING THE SAME", filed Mar. 31,1999;

Ser. No. 09/282,841, entitled "FLEXIBLE INTERFACE SIGNAL FOR USE IN AN OPTICAL DISK SYSTEM AND SYSTEMS AND METHODS USING THE SAME" filed Mar. 31,1999; and Ser. No. 09/282,849, entitled "SERVO CONTROLLER UTILIZING DELTA-SIGMA ANALOG TO DIGITAL CONVERTERS AND SYSTEMS AND METHODS USING THE SAME filed on Mar. 31,1999.

BACKGROUND OF THE INVENTION

1. Field of the Invention

The present invention relates in general to servo control and in particular to servo control circuitry with voltage offset control and systems and methods using the same.

2. Description of the Related Art

Optical disks have been used for many years for the mass storage of digital data. Some well known examples of optical disks include digital audio compact disks (CD-DAs), compact disk read-only memories (CD-ROMs) and digital video disks (DVD-ROMs). Essentially, digital data is stored on a plastic disk with a reflective surface as a series of pits and land in the reflective surface. During playback, a beam of light is directed to the rotating reflective surface and the intensity of the photons reflected from the pits and land measured. A modulated electrical signal is generated that can be processed and the data stored on the disk recovered.

A basic configuration for the read (playback) mechanism has developed over a number of years. This configuration includes a pickup or sled, which is movable so that a laser, a lens, and array of photodiodes can be positioned directly over the data being read off of the disk. As the disk turns, the photons from the laser are reflected off the pits and land and received by the photodiodes which generate electrical signals having a current that is proportional to photon density.

The multiple signals output from the photodiodes represent both data detection and servo alignment information. The summation of the high speed data channel signal, which may be composed of the signals A+B+C+D from an astigmatic photodiode array, results in a composite signal with relevant data information between approximately 10 KHz and 60 MHz for current DVD players.

Servo information contained in these signals however, is at frequencies less than 1 MHz (for current spindle rotation rates of <6000 RPM) down to DC. Because of these information rates, the data channel signal is sometimes AC-coupled to the data detection and summation circuitry mounted on an accompanying stationary circuit board. Otherwise, some degradation of the dynamic range must be accepted due to the dc content of the incoming signal.

The typical current signal generated by a photodiode is on the order of 1 uA. Transferring this signal directly down a flexible cable to the stationary circuit board therefore would seriously degrade the signal to noise ratio. Hence, transimpedance amplifiers, which convert the current from the photodiode array into a voltage for driving the cable, are mounted in the pickup to minimize noise and interference effects. The data detection, error correction, and servo systems are kept off of the pickup not only because the same interference reasons, but primarily to reduce the physical size and mass of the sled. These systems are mostly digital and switching noise on the pickup may degrade the signal to noise ratio.

On the fixed circuit board, the signals received from the pickup are amplified and converted to digital form. The primary processing functions, such as filtering, error correction and decoding then take place in the digital domain. At the backend, the processed digital data is reconverted to analog audio and video for driving the speakers and display screen.

One problem that can arise for the motors and actuators of the disk player when driving the servo control loops is voltage offset. For example, consider the pulse width modulated (PWM) signal that is used to drive the player spindle. This signal is generally a digital signal having a high voltage level approximating the supply voltage and a low voltage level approximating 0 volts or ground. The 50% voltage point between them is nominally the zero point for spindle motor rotation directional control. Typically, the PWM spindle control signal is generated off a clock signal having a 50% duty cycle.

Depending on the particular circuitry used, the precision of the PWM control signal can vary, which can introduce error in the spindle rotation. For example, the supply voltage may vary from chip to chip, may drift due to any one of a number of different operational factors, or may be subject to noise. Similarly, the low level voltage may not be fully clamped to ground. Moreover, the generating clock duty cycle will not be exactly 50% and the clock edges will have a finite rise and fall times. As a result, the high and low periods of the PWM signal may be slightly too high or slightly too low and thereby shorten or length the time the spindle motor is driven in a given direction.

In order to maintain the high quality playback for optical disk systems, a need has therefore arisen for methods and circuits for offset compensation in the servo control loops.

SUMMARY OF THE INVENTION

The principles of the present invention are disclosed with reference to an exemplary servo control circuit. A digital to analog converter converts digital servo control data into a pulse width modulated signal in response to a clock signal. A first conductor transmits the pulse width modulated signal to an external device while a second conductor transmits a reference signal derived from the clock signal to the external device. The external device differentially receives the pulse width modulated signal with respect to the reference signal.

The present inventive principles provide substantial advantages over the prior art. Among other things, circuits and methods are provided for accounting for drift in the supply voltage, a low voltage rail which is not sufficiently clamped to ground and noise. And moreover, errors in a servo control loop caused by the finite rise and fall times of the generating clock signals can also be canceled out using the reference signal.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIGS. 1–6 of the drawings, in which like numbers designate like parts.

Figure 1:
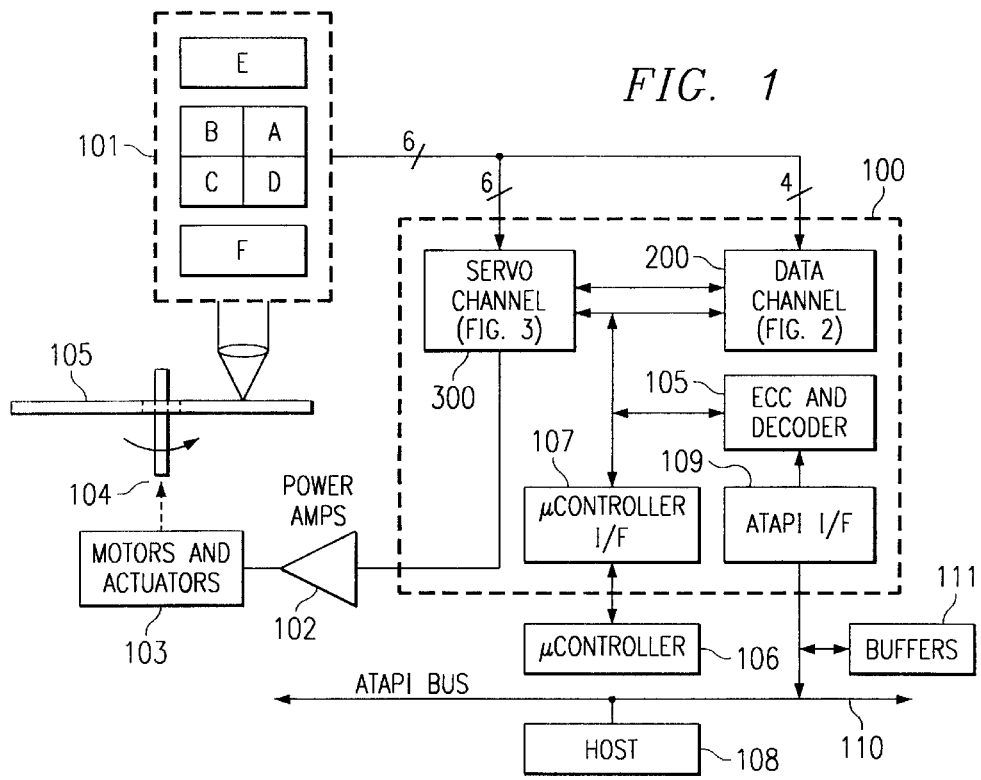
FIG. 1 is a conceptual diagram of an exemplary personal computer based optical disk playback system.

FIG. 1 is a conceptual diagram of an exemplary personal computer (PC) based optical disk playback system including a drive manager integrated circuit (IC or "chip") 100 embodying the present inventive concepts. It should be recognized however that IC 100 can also be used with CD or DVD players and DVD RAM systems. In addition to chip 100, the system also includes optical pickup 101, including the requisite laser, photodiode array and transimpedance amplifiers, and the power amplifiers 102 and motors & actuators 103 which control the player spindle 104 rotation and pickup 101 movement and alignment. In the preferred embodiment, drive manager chip 100 embodies decoding circuitry for processing data from either DVD-ROM, CD-ROM, DVD-RAM, CD-RAM, or CD-DA optical disks.

There are two principal processing paths, one each for the servo and data channels, the inputs of which are driven by the transimpedance amplifiers on optical pickup 101. The servo path is shown generally at 300 and the data path generally at 200. Each of these paths will be discussed in further detail below in conjunction with FIGS. 3 and 2 respectively. The output of the data channel is passed through ECC and Decoder 105 for additional processing such as error correction and content descrambling.

Local control is implemented by microcontroller 106 through microcontroller interface 107. Typically, local microcontroller 106 is user supplied for maximum flexibility and generally provides the instructions directing the on-board processors and error correction circuitry.

Chip 100 additionally communicates with a host processor 108 via an ATAPI bus interface 109 and ATAPI bus 110, in the case of a PC-based system. The host performs the actual processing of the audio/video information or data retrieved from the disk after error correction and buffering by chip 100. Among other things, the host performs audio and video MPEG decoding and generates the corresponding user interface. Buffers (DRAM) 111 support error correction functions and the streaming of data from chip 100 to host 108.

Figure 2:
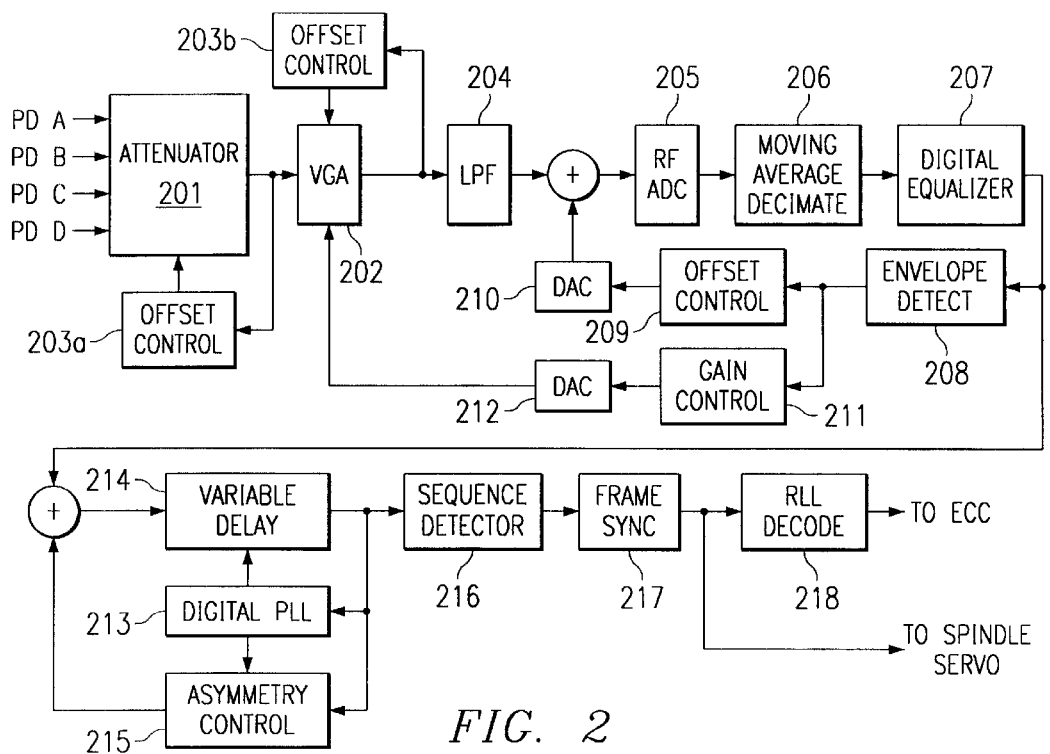
FIG. 2 is a detailed functional block diagram of the data path shown in FIG. 1.

Referring to FIG. 2 which is a detailed functional block diagram of data path 200, attenuators 201 are used in the preferred embodiment to protect the inputs to following VGAs from damage from any over-voltages produced by the pickup. Offset controls 202*a* and 203*b* allow the digital offset control loop discussed below to respond to dc and low frequency baseline offsets in attenuators 201 and VGAs 202.

Data channel summation and variable gain amplifier (VGA) circuitry 202 add one or more signals from the transimpedance amplifiers on pickup 101 to form a composite data signal (e.g., A+B+C+D). Alternatively, the signal addition may be done right on pickup 101, either electrically or optically. The VGA gain is controlled by automatic gain control loops, also discussed below.

A low pass filter (LPF) 204 provides anti-aliasing for flash analog to digital converters 205. A digital moving average of the output of ADCs 205 is taken and filter 206 applied to reject noise and interference in the Nyquist bandwidth, as well as perform a decimation. It should be noted that any one of a number of other types of filters can be used to achieve the same result. The decimating filter 206 can also be used to lower the effective sampling rate of the data for subsequent digital data processing. The data are then digitally equalized using a multiple-tap finite impulse response (FIR) filter 207 adjustable to differing data rates and disk resolutions. Advantageously, the front-end analog circuits are simplified since data are immediately digitized and the necessary equalization is performed digitally.

Automatic offset control is implemented by the loop including envelope detectors 208, offset controls 209 and DACs 210. Envelope detectors 208 detect both the top and bottom envelopes of the high speed data signal. These envelopes are summed to produce an error signal which is passed through an offset loop compensation filter within offset control block 209 and integrated. The output of the loop compensation filter is converted to analog form by DACs 210 and summed with the output of LPF 204.

Gain control loop 211 also takes the difference between the amplitudes of top and bottom detected envelopes and subtracts a pre-programmed gain value. A gain loop compensation filter integrates the results and produces a linearized signal which is converted by DACs 212 to analog form and passed to VGAs 202 to adjust the signal gain.

An interpolating digital phased-locked loop (DPLL) 213 retimes the data after ADC sampling and digital equalization. DPLL 213 operates on sampled amplitudes and generally includes a digital phase error detector, digital loop compensation filter, and digital frequency to phase integrator (digital VCO). Variable delay filter 214 interpolates the asynchronous digital samples to ideal synchronously sampled samples at the front of the DPLL. The phase detector then generates an error signal using a stochastic process which compares the incoming data with ideal target sampling values without noise. The error signal is multiplied by the derivative of the target data to produce phase error estimates. The loop compensation filter performs a proportional integration and the result is sent to variable delay filter 214 to adjust the delay and correct for phase errors.

Advantageously, digital PLL 213 allows the ADC and equalizer to operate at a fixed asynchronous sample rate to the data.

Asymmetry control circuitry 215 includes a control loop which corrects the read errors from the optical pickup. The errors are detected using either the slicer duty cycle or zero crossing errors. The errors are then scaled and integrated by a compensation filter and the resulting compensation signal summed at the input to variable delay filter 214.

The retimed data is then processed by a maximum likelihood sequence detector 216. The partial response equalization target assumed in this detector is $G(D)=1+D+D^2+D^3$. Other targets may be used in alternate embodiments.

The output of sequencer 216 is synchronized by frame synchronization circuitry 217 and then passed to Run Length Limit ("RLL") decoder 218. RLL code embedded in the disk is used as an indication of disk defects. Generally, a state machine checks for violation of the RLL code "k-constraint" and failures in synchronization and then causes the data channel to "coast" through the defect and then resynchronizes the data stream.

Automatic Zone Control (AZC) logic (not shown) takes advantage of the digital nature of the data channel by initializing subsystems based on data rate. For example, the tap weights and tap spacing of the digital equalizer are set to correspond to one of six incoming data rates. Similarly, the loop coefficients, and hence the loop dynamics, of interpolating digital PLL 213 are controlled by the AZC logic.

In sum, the data channel is a bandpass system with signals in the 10 kHz to 60 MHz range. The signal spectrum below 10 kHz is either servo information or external dc offsets from the pickup electronics. The presence of this information reduces the dynamic range and bandwidth of the data channel. Using an off-chip ac coupling capacitor would reduce the dc offset but block the low frequency servo information. Instead, the dc signal is brought on-chip and a control loop performs the effective ac coupling for the data channel. Not only are external coupling capacitors unnecessary, but defect detection by the downstream digital processing can freeze this control loop when a defect is reached, unlike an ac coupled system where the baseline wanders. The offset and AGC loops are also frozen until data transitions are detected. Co-pending and co-assigned application Ser. No. 08/056,569, entitled "SYSTEM AND METHOD FOR CONTROL OF LOW FREQUENCY INPUT LEVELS TO AN AMPLIFIER AND COMPENSATION OF INPUT OFFSETS OF THE AMPLIFIER" filed Oct. 23, 1997; contains related information.

Decoder block 105 (FIG. 1) manages the flow of data between the data channel and external DRAM buffer 111 and manages PC host ATAPI interface 109. The ECC circuitry performs realtime ECC correction for DVD data and layered ECC correction for CD-ROM data. Additionally, 8–14 demodulation is provided for DVD data and EFM demodulation for error correction and deleaving of CD-DA and CD-ROM data. A burst cutting area (BCA) decoder is built-in chip 100 for DVD-ROM applications. DVD Navigation Play for DVD player operations is supported along with CSS circuitry for descrambling DVD data which has been scrambled under the Content Scramble System. The error correction and decoding functions are supported by on-chip SRAM.

Figure 3:
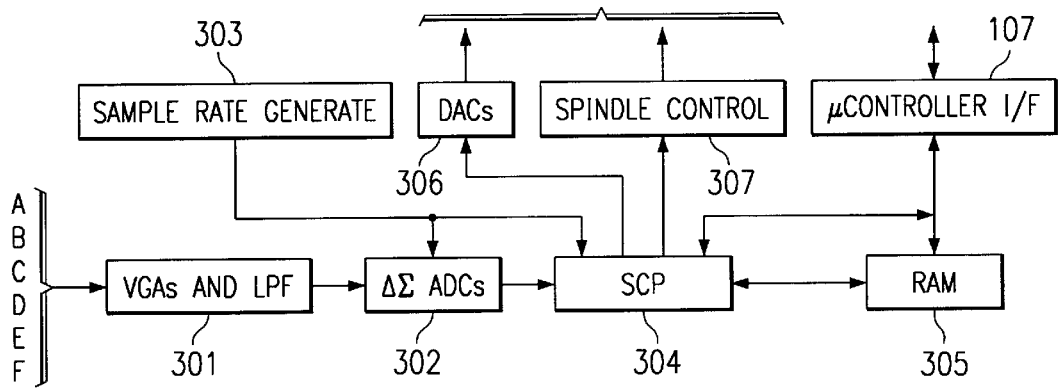
FIG. 3 is a diagram showing further detail of the servo control path shown in FIG. 1.

As indicated above, the second principal signal path of the chip 100 controls servo operation and is shown generally at 300 in FIG. 1 and in further detail in FIG. 3. The integrated servo system operates four control loops: focus, tracking, sled, and spindle, using an internal servo control processor requiring little external microcontroller intervention.

Servo data is received from each of the six photodiodes 101 and then amplified by six VGAs 301. As a result, the following ADCs 302 only require 60 dB of dynamic range, because servo VGAs 301 boost the input signal by as much as 28 dB. Advantageously, reduced requirements of ADC dynamic range results in lower delay. VGAs 301 also incorporate low pass filtering (LPF) for anti-aliasing. Preferably three pole filters are used with one pole in front of the VGAs and two poles after the VGAs.

Analog to digital conversion is done immediately after low pass filtering such that the analog/digital boundary is as close to the input as possible. An input sampling frequency of 24 MHz (generated on-chip by sample rate generator 303, the input signal is sampled at 24 MHz, data samples produced for digital filtering at 12 MHz rate) and a third order delta-sigma modulator reduce digital filter delay inside the servo loop.

Servo data processing is performed by on-board servo control processor (SCP) 304, which receives its instruction set from the user selected local microcontroller 106 through interface 107 and RAM 305.

Unlike CD systems, DVD servo systems use differential phase detection (DPD) between the photodiode signals D1,D2 (D1=A+C, D2=B+D) for track following and track counting. A digital adaptive correlator is implemented. The digital hardware implementation is superior to the conventional DPD methods based on a simple phase detector and analog filters.

Analog control signals are transmitted to power amplifiers 102 through DAC array 306 and spindle controls 307.

Figure 4:
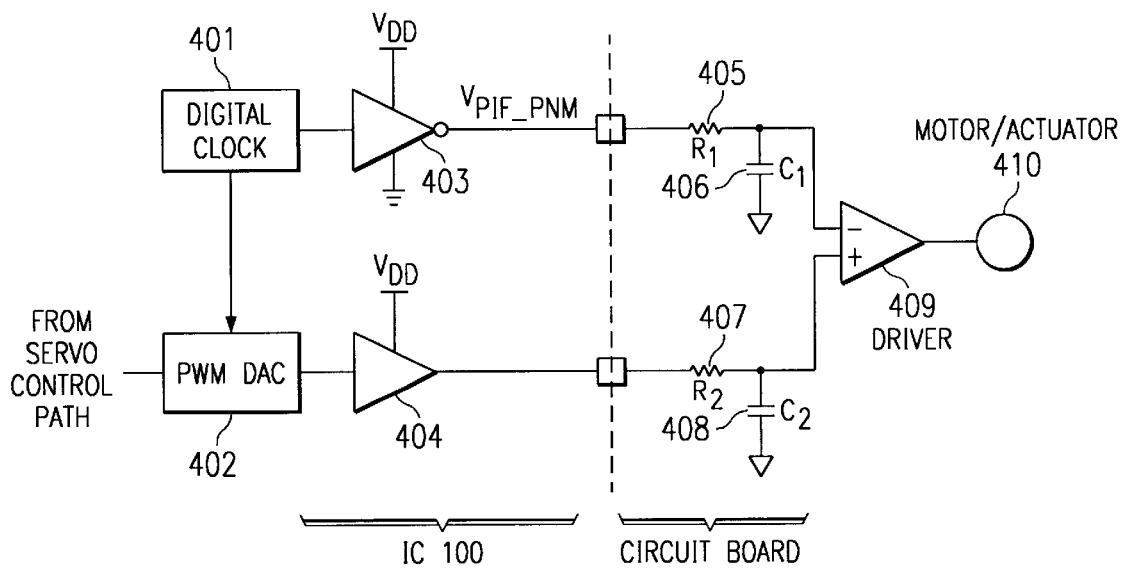
FIG. 4 is a diagram of the output portion of the spindle control loop of the servo control path of FIG. 3 according to one embodiment of the present principles.

FIG. 4 illustrates one embodiment of the principles of the present invention suitable for compensating for offset in a servo control loop, such as that used to drive the spindle of FIG. 1. Here, the digital clock 401 used by PWM (pulse width modulated) DAC 402 to drive the spindle motor/actuator is also sent off-chip through an invertor/buffer 403 as a differential reference to the DAC output. Additionally, inverter/buffer 403 operates from the same supply voltage source $V_{DD}$ as the buffer 404 provided at the output of PWM DAC 402.

The reference signal is filtered at the circuit board in this illustration by an R-C filter comprising resistor 405 and capacitor 406. It should be noted that resistor 405 could also be fabricated on chip, if space permits, and that the passive R-C filter could be replaced with an active filter in alternate embodiments. The DAC output is similarly filtered by an R-C filter comprised of resistor 407 and capacitor 408. The filtered servo PWM signal is sent differentially to the motor/actuator 410 referenced against the filtered reference signal. The electromechanical drive circuitry for motor/actuator 410 is generally represented by differential amplifier 409 in FIG. 4.

Since the reference signal and the PWM signal are driven from the same supply voltage source, any offset caused by supply voltage inaccuracy, drift, or noise will be canceled. Further, since the same clock is used to generate both signals, the rising and falling edges will generally track thereby canceling an error caused by the finite transition times. Similarly, inaccuracies in the duty cycle of the clock are compensated for as the signal received by the motor/actuator tracks the duty cycle of the reference signal.

Figure 5:
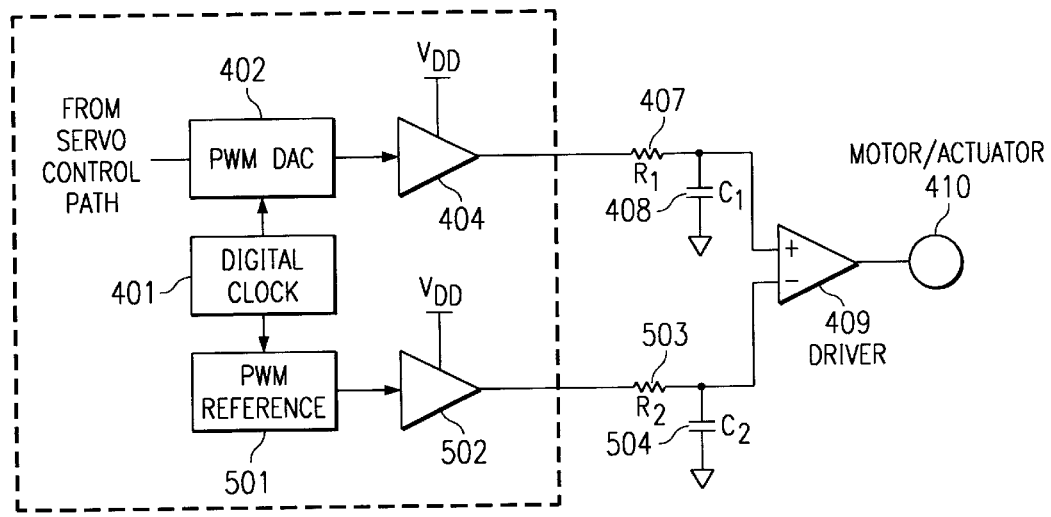
FIG. 5 is a diagram of the output portion of the spindle control loop of the servo control path of FIG. 3 according to a second embodiment of the present principles.

A second embodiment of the present principles can now be described in reference to FIG. 5. In this case, the reference signal is generated by PWM Reference circuitry 501 which essentially duplicates the circuitry of PWM DAC 402. PWM Reference circuitry operating from the same digital clock source 401, generates a midscale reference signal representing the zero point of motor/actuator 410 from a fixed input signal. Buffer 502 at the output of PWM Reference circuitry 501 operates from the same voltage rails as buffer 404 at the output of DAC 402. Filtering is again provided for the reference signal, this time by resistor 503 and capacitor 504.

As was with the case discussed above, in the embodiment of FIG. 5, variations in the supply voltage cancel out since both the primary and reference signals are driven from the same on-chip voltage supply. Additionally, the use of a single clock source allows for the compensation of errors caused by the duty cycle and slew rate of the clock signal itself.

Figure 6:
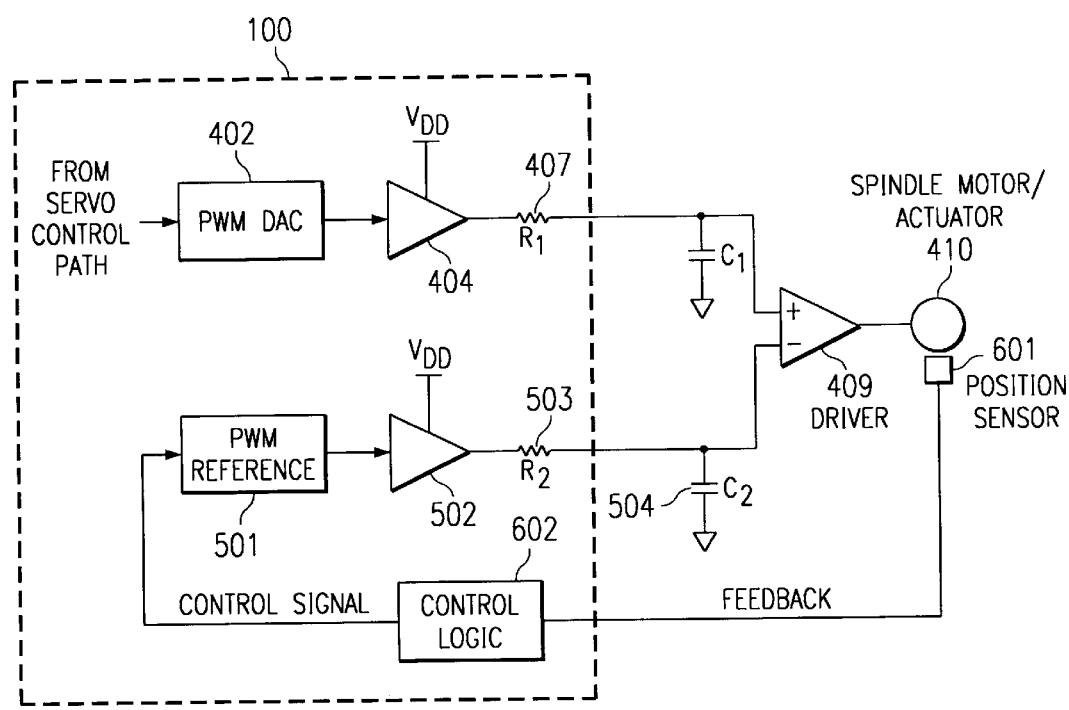
FIG. 6 is a diagram of the output portion of the spindle control loop of the servo path of FIG. 3 according to a third embodiment of the present principles.

An expanded embodiment is shown in FIG. 6. Here, feedback from a position sensor 601 at the motor/actuator provides feedback indicative of the amount of offset voltage being seen by the motor. Control logic 602 processes this feedback and the resulting error signal is sent to PWM Reference circuitry to adjust the midlevel voltage. In this embodiment, resistors 407 and 503 are shown on-chip.

In sum, a reference is generated on-chip for selected servo control signals using the same voltage and clock sources used to generate those control signals. In this manner, the reference is made to generally track the control signal such that errors can be canceled at the motor/actuator using a differential amplifier.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A method of compensating for voltage offset in servo control circuitry driving an electromechanical device comprising the steps of:

generating a pulse width modulated control signal with a first digital to analog converter in response to a clock signal for controlling the electromechanical device;

generating a pulse width modulated reference signal with a second digital to analog converter from the clock signal; and differentially transmitting the control signal and reference signal to control circuitry associated with the electromechanical device; and canceling out voltage offset from the control signal with the reference signal to drive the electromechanical device.

2. The method of claim 1 wherein said step of generating a reference signal comprises the step of operating on a fixed input signal with the second digital to analog converter.

3. The method of claim 1 wherein said step of canceling comprises the step of receiving the control and reference signals at the non-inverting and inverting inputs of a differential amplifier forming a portion of the control circuitry associated with the electromechanical device.

4. The method of claim 1 wherein said step of transmitting comprises the step of transmitting both the control and reference signals using the same voltage source.

5. An optical disk system comprising:

a disk drive for rotating an optical disk and including electromechanical drive control circuitry;

an optical pickup for converting photons reflected from the optical disk into electrical signals;

servo control circuitry for processing the electrical signals and controlling the disk drive and optical pickup in response, the servo control circuitry comprising:

a first digital to analog converter for converting digital servo control data into a pulse width modulated control signal in response to a clock signal;

a first conductor for transmitting the pulse width modulated control signal to the electromechanical drive control circuitry of the disk drive;

a second digital to analog converter substantially replicating the first digital to analog converter for generating a pulse width modulated reference signal from the clock; and a second conductor from transmitting the reference signal derived from the clock to the electromechanical drive control circuitry, the electromechanical drive control circuitry canceling voltage offset in the pulse width modulated control signal with the pulse width modulated reference signal.

6. The disk system of claim 5 wherein the electromechanical drive control circuitry drives a motor forming a portion of the disk drive.

7. The disk system of claim 5 wherein the electromechanical drive control circuitry drives an actuator forming a portion of the disk drive.

* * * * *